United States Patent
Jackson et al.

(10) Patent No.: US 9,252,939 B1
(45) Date of Patent: Feb. 2, 2016

(54) SINGLE CABLE VSAT INTERFACE WITH SINGLE CONVERSION ARCHITECTURE FOR RECEIVE AND TRANSMIT

(71) Applicant: Hughes Network Systems, LLC, Germantown, MD (US)

(72) Inventors: Thomas Jackson, Monrovia, MD (US); George Eapen, Boyds, MD (US)

(73) Assignee: Hughes Network Systems, L.L.C.

(*) Notice: Subject to any disclaimer, the term of this patent is extended or adjusted under 35 U.S.C. 154(b) by 0 days.

(21) Appl. No.: 14/498,777

(22) Filed: Sep. 26, 2014

(51) Int. Cl.
*H04L 5/14* (2006.01)
*H04B 1/00* (2006.01)

(52) U.S. Cl.
CPC .............. *H04L 5/143* (2013.01); *H04B 1/0082* (2013.01)

(58) Field of Classification Search
CPC ..... H04L 5/143; H04L 25/4904; H04L 27/02; H04L 27/2275; H04L 25/0274; H04L 25/10; H04L 27/0002; H04L 27/2647; H04L 27/2657; H04L 27/2679; H04L 41/24; H04B 1/0082; H04B 7/18528; H04B 7/18517; H04B 1/04; H04B 7/2628; H04B 7/18563; H04B 10/25073; H04B 15/00; H04B 17/0082; H04H 40/90; H03J 1/0091
See application file for complete search history.

(56) References Cited

U.S. PATENT DOCUMENTS

| | | | | |
|---|---|---|---|---|
| 8,335,515 | B2* | 12/2012 | Goerke | H04B 7/18539 455/12.1 |
| 2002/0106018 | A1* | 8/2002 | D'Luna | G06T 9/007 375/240.01 |
| 2002/0168936 | A1* | 11/2002 | Zilberstein | H04B 7/18528 455/12.1 |
| 2004/0229562 | A1* | 11/2004 | Wren et al. | 455/3.02 |
| 2004/0246891 | A1* | 12/2004 | Kay et al. | 370/215 |
| 2006/0160500 | A1* | 7/2006 | Ammar | 455/118 |
| 2010/0017826 | A1* | 1/2010 | Fitting | 725/65 |
| 2010/0022191 | A1* | 1/2010 | Sigmund | 455/67.11 |
| 2010/0097980 | A1* | 4/2010 | Lloyd et al. | 370/316 |
| 2011/0028088 | A1* | 2/2011 | Avellan et al. | 455/13.2 |
| 2015/0244548 | A1* | 8/2015 | Weissman | H04L 27/0002 455/42 |

* cited by examiner

*Primary Examiner* — Hirdepal Singh
(74) *Attorney, Agent, or Firm* — Capitol City TechLaw; Jasbir Singh

(57) ABSTRACT

A VSAT system modem has three chips and a block. A first chip generates a modulated carrier signal and a local oscillator signal having a same frequency. A second chip receives the local oscillator signal from the first chip and produces a reference signal. The reference signal and the modulated carrier signal are received by the block, which multiplexes the reference signal and the modulated carrier signal onto a single inter-facility link. The single inter-facility link transmits the modulated carrier signal and the reference signal and provides a received modulated carrier signal to a third chip. The first chip may be a synthesizer/modulator chip, the second chip may be a prescaler chip, the third chip may be a DVB-S2 tuner chip and the block may be a multiplexer. The chips may be standard semiconductor chips. Alternatively, a digital-to-analog converter chip may produce the reference signal.

20 Claims, 2 Drawing Sheets

SINGLE CABLE VSAT INTERFACE WITH SINGLE CONVERSION ARCHITECTURE FOR RECEIVE AND TRANSMIT

FIELD OF THE INVENTION

The invention relates to a very small aperture terminal (VSAT) product or any other radio application in which a wide frequency range is to be covered for receiving and transmitting. In particular, embodiments relate to a method and a modem for using a single inter-facility link for transmitting and receiving signals between two components of a communication system.

BACKGROUND

Transmit and receive signals between a VSAT system modem and outdoor radio equipment of a VSAT product are in an L band frequency range and cover a wide range such as, for example, 950 MHz to 1950 MHz. In order to avoid interference between transmit and receive signals, VSAT products generally have two inter-facility links (IFLs) connecting the VSAT system modem and the outdoor radio equipment. A first IFL is used for transmitting signals from the VSAT system modem to the outdoor radio equipment and a second IFL is used for receiving signals by the VSAT system modem from the outdoor radio equipment.

Some companies have developed VSAT products having only a single IFL between a VSAT system modem and outdoor radio equipment. However, the outdoor radio equipment includes expensive custom conversion chips to perform double frequency conversions in order to avoid frequency overlap of transmit and receive signals on the single IFL. VSAT products with custom conversion chips in the outdoor unit also have custom or non-broadcast satellite tuner chips in the indoor VSAT system modem.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In a first embodiment, a very small aperture terminal modem is provided. The very small aperture terminal modem includes a first standard chip, a second standard chip, a third standard chip, and a multiplexer. The first standard chip generates a modulated carrier signal and a local oscillator signal, both of which have a same frequency. The second standard chip receives the local oscillator signal from the first chip and divides down the local oscillator signal to produce a reference signal. The multiplexer receives the reference signal from the second standard chip and the modulated carrier signal from the first standard chip and multiplexes the reference signal and the modulated carrier signal to a single inter-facility link. The single inter-facility link is arranged to transmit, from the very small aperture terminal modem, the modulated carrier signal and the reference signal. The single inter-facility link is further arranged to provide, to the third standard chip via the multiplexer, a received modulated carrier signal.

In a second embodiment, a machine-implemented method is provided for a very small aperture terminal modem. A first standard component of the very small aperture modem generates a modulated carrier signal of about 2 GHz and a local oscillator signal of about 2 GHz. A second standard component of the very small aperture terminal modem receives the local oscillator signal from the first component and downconverts the received local oscillator signal to produce a reference signal in a range from about 212 MHz to about 218 MHz. A multiplexer of the very small aperture terminal modem receives the modulated carrier signal from the first standard component and the reference signal from the second standard component and multiplexes the modulated carrier signal and the reference signal onto a single inter-facility link connecting the very small aperture terminal modem with an outdoor unit. The single inter-facility link is arranged to carry the modulated carrier signal and the reference signal from the very small aperture terminal modem to the outdoor unit, and is further arranged to receive a second modulated carrier signal in a range from 950 MHz to 1450 MHz from the outdoor unit via the multiplexer and a third standard component.

In a third embodiment, semiconductor chips for use in a modem are provided. The semiconductor chips include a standard synthesizer/modulator chip a standard digital-to-analog converter chip, a standard DVB-S2 tuner chip, and a standard multiplexer block. The synthesizer/modulator chip generates a modulated carrier signal. The standard digital-to-analog converter chip is arranged to generate a reference signal. standard multiplexer block is arranged to receive the modulated carrier signal from the standard synthesizer/modulator chip and the reference signal from the standard digital-to-analog converter chip and multiplex the modulated carrier signal and the reference signal onto a single inter-facility link. The single inter-facility link is arranged to carry the modulated carrier signal and the reference signal from the modem, and is further arranged to carry a second modulated carrier signal, to the standard multiplexer block, at a frequency different from the modulated carrier signal and the reference signal. The standard multiplexer block is arranged to provide the second modulated carrier signal to the standard DVB-S2 tuner chip.

DRAWINGS

In order to describe the manner in which the above-recited and other advantages and features can be obtained, a more particular description is provided below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

In various embodiments, a modem such as, for example, a VSAT system modem, includes multiple semiconductor chips. A first standard semiconductor chip generates a modulated carrier signal and a local oscillator signal, both of which may have a same frequency. In some implementations, the modulated carrier signal and the local oscillator signal may both have a frequency of 1.921 GHz, which is in an L frequency band. A second standard semiconductor chip receives the local oscillator signal from the first standard semiconductor chip and downconverts the local oscillator signal to produce a reference signal. In some implementations, the produced reference signal may have a frequency in a range of 213.503 MHz to 218.978 MHz. A standard multiplexer block receives the produced reference signal from the second standard semiconductor chip and the modulated carrier signal from the first standard semiconductor chip and multiplexes the reference signal and the modulated carrier signal onto a single IFL, which may connect the modem with outdoor radio equipment. In some implementations, the single IFL carries a 2 GHz modulated transmit signal and the reference signal to the outdoor radio equipment from the modem and a 950 MHz to 1450 MHz receive signal from the outdoor radio equipment to the a third standard semiconductor chip in the modem.

In another embodiment, a method is provided for a modem such as, for example, a VSAT system modem. A modulated carrier signal at a fixed 2 GHz frequency is generated by a first component, which may be a standard synthesizer/modulator chip. A reference signal in a range of 212.891 MHz to 218.75 MHz is generated with a second component of the modem, which may be a standard digital-to-analog converter (DAC) chip. A standard multiplexer block of the modem receives the modulated carrier signal from the first component and the reference signal from the second component and multiplexes the modulated carrier signal and the reference signal onto a single IFL, which may be connected to outdoor radio equipment. The single IFL is capable of carrying a transmit signal and the reference signal from the modem and a received carrier signal from the outdoor radio equipment to the modem. The received carrier signal may be received by the standard multiplexer block, which may provide the received carrier signal to a third standard component, which may be a standard DVB-S2 tuner chip. In some implementations, the received carrier signal may have a frequency range of 950 MHz to 1450 MHz.

Existing Communication System

Figure 1:
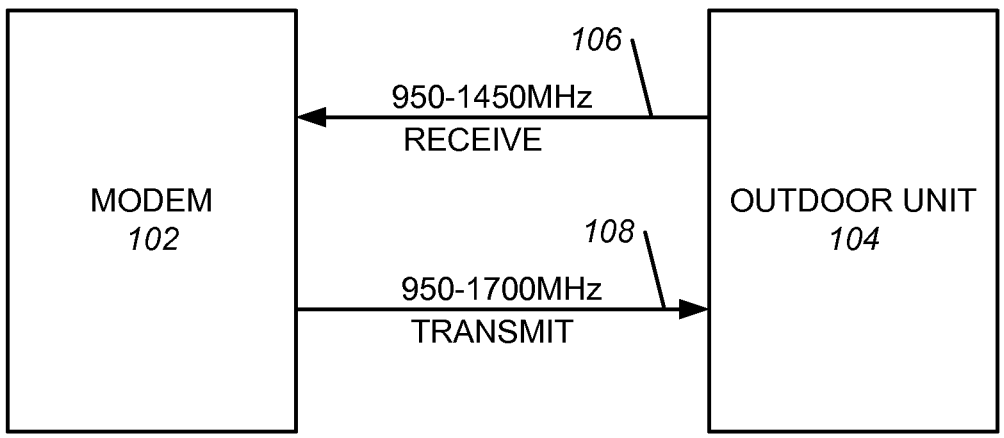
FIG. 1 illustrates a portion of an existing VSAT communication system.

FIG. 1 illustrates a portion of an existing VSAT product 100 having a VSAT system modem 102 and an outdoor unit 104 having radio equipment. Modem 102 and outdoor unit 104 are connected via two IFLs 106, 108. IFL 106 is arranged to carry signals from outdoor unit 104 to modem 102. The carried signals may be in a frequency range of 950 MHz to 1450 MHz. IFL 108 is arranged to carry signals transmitted from modem 102 to outdoor unit 104. The signals transmitted from modem 102 may be in a frequency range of 950 MHz to 1700 MHz. VSAT product 100 uses two IFLs because the frequency overlap of the transmitted signals from modem 102 and the signals from outdoor unit 104 would interfere with one another on a single IFL.

Communication System Consistent with Various Embodiments

Figure 2:
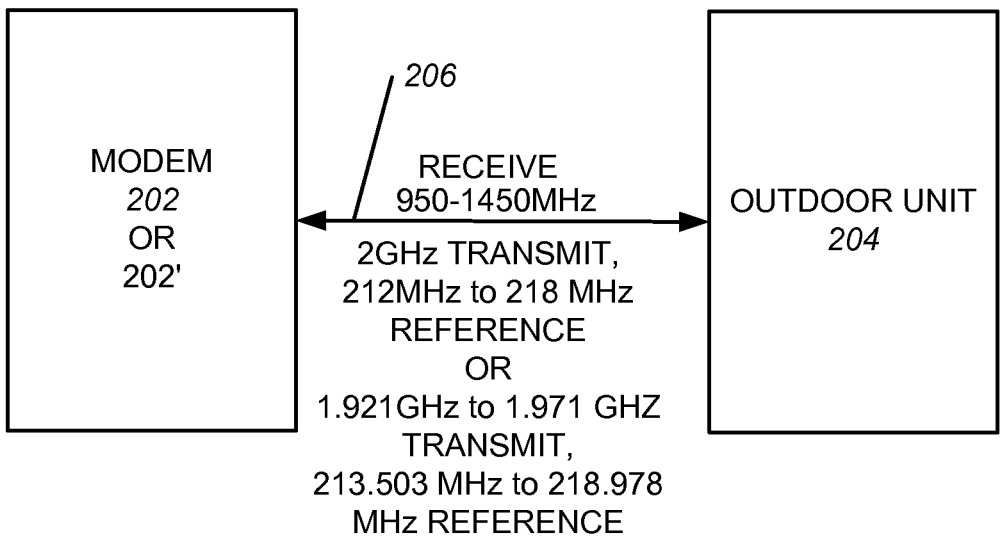
FIG. 2 illustrates a portion of a VSAT communication system consistent with embodiments of the invention.

FIG. 2 illustrates a portion of an exemplary VSAT system 200 consistent with embodiments of the invention. VSAT system 200 may include a VSAT system modem 202 or 202' and an outdoor unit 204 having radio equipment. A single IFL 206 may connect modem 202 or 202' and outdoor unit 204. Single IFL 206 is arranged to carry a transmit signal and a reference signal from modem 202 or 202' to outdoor unit 204 and a receive signal from outdoor unit 204 to modem 202 or 202'. In some implementations, the transmit signal may have a frequency of 2 GHz, which is in an L frequency band, and the reference signal may have a frequency in a range of 212.891 MHz to 218.75 MHz. The receive signal may have a frequency in a range of 950 MHz to 1450 MHz. In other implementations, the transmit signal may have a frequency in a range of 1.921 GHz to 1.971 GHz, and the reference signal may have a frequency in a range of 213.503 MHz to 218.978 MHz. No frequency overlap occurs, thereby making use of a single IFL without interference possible.

Figure 3:
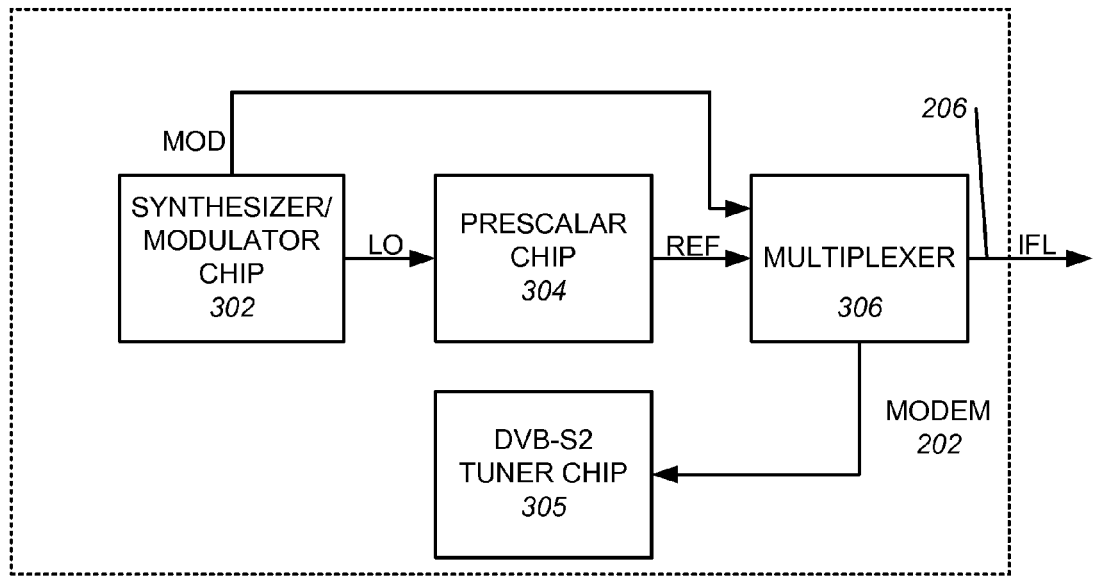
FIG. 3 shows a detailed view of a portion of a VSAT modem in an embodiment.

FIG. 3 illustrates a portion of modem 202, which makes use of single IFL 206 possible. Modem 202 may include three semiconductor chips, which may be standard chips for use in communication systems such as, for example, satellite communication systems. The three semiconductor chips may be a synthesizer/modulator chip 302, a prescaler chip 304, and a DVB-S2 tuner chip 305.

Synthesizer/modulator chip 302 may generate a modulated carrier signal and a local oscillator signal. The modulated carrier signal and the local oscillator signal may have a same frequency. In some implementations, the modulated carrier signal and the local oscillator signal may both have a frequency of 1.921 GHz, which is in an L frequency band. Prescaler chip 304 receives the local oscillator signal from synthesizer/modulator chip 302 and downconverts the local oscillator signal to produce a reference signal. In some implementations, the reference signal may have a frequency range of 213.503 MHz to 218.978 MHz. The modulated carrier signal from synthesizer/modulator chip 302 and the reference signal from prescalar chip 304 may be received by multiplexer block 306, which multiplexes the modulated carrier signal and the reference signal onto single IFL 206. As previously mentioned, single IFL 206 may carry the modulated carrier signal and the reference signal from modem 202 to outdoor unit 204 and may carry a received signal to modem 202 from outdoor unit 204. The received signal may be processed by DVB-S2 tuner chip 305, which may downconvert a DVB-S2 signal for baseband processing. In some implementations, the received signal may be in a frequency range of 950 MHz to 1450 MHz.

Figure 4:
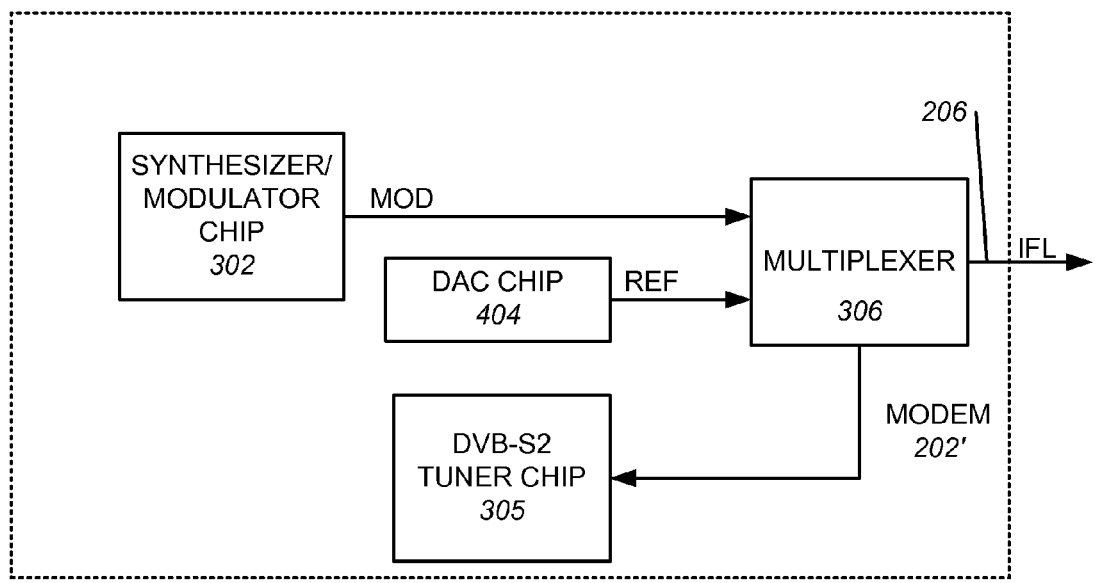
FIG. 4 shows a detailed portion of a VSAT modem in a second embodiment.

FIG. 4 illustrates a portion of another embodiment of a modem, which makes use of single IFL 206 possible. Modem 202' may include three semiconductor chips, which may be standard chips for use in communication systems such as, for example, satellite communication systems. The three semiconductor chips may be synthesizer/modulator chip 302, a DAC chip 304, and a DVB-S2 tuner chip 306.

Synthesizer/modulator chip 302 may generate a modulated carrier signal of 2 GHz. DAC chip 404 may generate a digital reference signal having a frequency in a range from 212.891 MHz to 218.75 MHz and may convert the digital reference signal to an analog reference signal with a same frequency. The modulated carrier signal from synthesizer/modulator chip 302 and the reference signal from DAC chip 404 may be received by multiplexer block 306, which multiplexes the modulated carrier signal and the reference signal onto single IFL 206. Single IFL 206 may carry the modulated carrier signal and the reference signal from modem 202' to outdoor unit 204 and may carry a received signal to DVB-S2 tuner chip 305 via multiplexer block 306 from outdoor unit 204. In some implementations, the received signal may be in a frequency range of 950 MHz to 1450 MHz.

Various embodiments reduce a cost of installing a VSAT system by allowing the use of a single IFL between a VSAT system modem and an outdoor unit. Further, the various embodiments use standard semiconductor chips, thereby keeping costs down.

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they should not be construed as limiting the claims in any way. Other configurations of the described embodiments are part of the scope of this disclosure. Further, implementations consistent with the subject matter of this disclosure may have more or fewer acts than as described, or may implement acts in a different order than as shown. Accordingly, the appended claims and their legal equivalents should only define the invention, rather than any specific examples given.

We claim as our invention:

1. A very small aperture terminal modem comprising:
a first chip, of the very small aperture terminal modem, to generate a modulated carrier signal and a local oscillator signal having a same frequency as the modulated carrier signal, the modulated carrier signal having a frequency which varies within a first range of frequencies;
a second chip, of the very small aperture terminal modem, to divide down the local oscillator signal, received from the first chip, to produce a reference signal having a frequency which varies within a second range of frequencies;
a block, of the very small aperture terminal modem, to receive the reference signal from the second chip and the modulated carrier signal from the first chip and multiplex the reference signal and the modulated carrier signal onto a single inter-facility link; and
a third chip of the very small aperture terminal modem, wherein
the single inter-facility link is arranged to transmit, from the very small aperture terminal modem, the modulated carrier signal and the reference signal, and is further arranged to provide, to the third chip, a received modulated carrier signal.

2. The very small aperture terminal modem of claim 1, wherein the first chip is a synthesizer/modulator chip.

3. The very small aperture terminal modem of claim 2, wherein the first chip is a standard chip for use in a communication system.

4. The very small aperture terminal modem of claim 2, wherein:
the second chip is a prescalar chip, and
the synthesizer/modulator chip and the prescalar chip are standard chips for use in a communication system.

5. The very small aperture terminal modem of claim 1, wherein the second chip is a prescalar chip.

6. The very small aperture terminal modem of claim 5, wherein the prescalar chip is a standard chip for use in a communication system.

7. A machine-implemented method performed by a very small aperture terminal modem, the method comprising:
generating a modulated carrier signal by a first component of the very small aperture terminal modem;
performing either a second method or a third method, the second method comprising:
generating a local oscillator signal, having a varying frequency in a first frequency range from 1.921 GHZ to 1.971 GHZ, by the first component, and
receiving, by a second component of the very small aperture terminal modem, the local oscillator signal from the first component and downconverting the received local oscillator signal to produce a reference signal having a varying frequency in a second frequency range from 213.503 MHz to 218.978 MHZ; and
the third method comprising:
converting, by a fourth component of the very small aperture terminal modem, a generated digital reference signal to an analog reference signal having a varying frequency in a third frequency range; and
receiving, by a third component of the very small aperture terminal modem, the modulated carrier signal and the reference signal and multiplexing the modulated carrier signal and the reference signal onto a single inter-facility link connecting the very small aperture terminal modem with an outdoor unit, wherein
the single inter-facility link is arranged to carry, from the very small aperture terminal modem to the outdoor unit, the modulated carrier signal and the reference signal, and is arranged to provide, to a fifth component of the very small aperture terminal modem from the outdoor unit, a second modulated carrier signal in a frequency range from 950 MHz to 1450 MHz.

8. The machine-implemented method of claim 7, wherein the third component is a multiplexer block.

9. The machine-implemented method of claim 7, wherein:
the second method is performed, and
the second component is a prescalar chip.

10. The machine-implemented method of claim 7, wherein the first component is a synthesizer modulator chip.

11. The machine-implemented method of claim 7, wherein:
the third method is performed, and
the fourth component is a digital-to-analog chip.

12. The machine-implemented method of claim 7, wherein:
the second method is performed, and
the first component, the second component and the third component are standard components for use in satellite communication systems.

13. The machine-implemented method of claim 7, wherein:
the third method is performed, and
the first component, the fourth component, and the third component are standard chips for use in satellite communication systems.

14. A combination for use in a very small aperture terminal modem, the combination comprising:
a synthesizer/modulator chip, of the very small aperture terminal modem, for generating a modulated carrier signal;
either
a prescalar chip, of the very small aperture terminal modem, arranged to receive a local oscillator signal having a variable frequency, within a first frequency range, generated by the synthesizer/modulator chip and further arranged to downconvert the local oscillator signal to produce a reference signal having a variable frequency within a second frequency range,
or a digital-to-analog converter chip, of the very small aperture terminal modem, to convert a digital reference signal to an analog reference signal having a varying frequency within a third frequency range;

a multiplexer block arranged to receive the modulated carrier signal and the reference signal and multiplex the modulated carrier signal and the reference signal onto a single inter-facility link; and a DVB-S2 tuner chip, of the very small aperture terminal modem, wherein the single inter-facility link is arranged to carry, from the very small aperture terminal modem, the modulated carrier signal and the reference signal, and is further arranged to carry, to the DVB-S2 tuner chip via the multiplexer block, a second modulated receive carrier signal at a frequency different from the modulated carrier signal and the reference signal.

15. The combination of claim 14, wherein the synthesizer/modulator chip, the prescalar chip, and the DVB-S2 tuner are standard chips for use in satellite communication systems.

16. The combination of claim 14, wherein the synthesizer/modulator chip and the digital-to-analog converter chips are standard chips for use in a satellite communication system.

17. The combination of claim 14, wherein:

the dVB-S2 tuner chip is arranged to receive the second modulated receive carrier signal and downconvert the second modulated receive carrier signal for baseband processing.

18. The combination of claim 14, wherein the second modulated receive carrier signal has a frequency in a range of 950 MHz to 1450 MHz.

19. The combination of claim 14, wherein the modulated carrier signal has a frequency in an L frequency band.

20. The combination of claim 14, wherein:

either the modulated carrier signal has a frequency of 2 GHz, and the reference signal has a frequency in a range of 212.891 MHz to 218.75 MHz, or the modulated carrier signal has a frequency in a range of 1.921 GHz to 1.971 GHz, and the reference signal has a frequency in a range of 213.503 MHz to 218.978 MHz.

* * * * *